US010264900B2

(12) United States Patent
Grive

(10) Patent No.: US 10,264,900 B2
(45) Date of Patent: Apr. 23, 2019

(54) FOODSTUFF SUPPORT DEVICE

(71) Applicant: Connexions Plastics Ltd., Barwell (GB)

(72) Inventor: Terence Grive, Barwell (GB)

(*) Notice: Subject to any disclaimer, the term of this patent is extended or adjusted under 35 U.S.C. 154(b) by 46 days.

(21) Appl. No.: 15/489,879

(22) Filed: Apr. 18, 2017

(65) Prior Publication Data

US 2018/0125272 A1 May 10, 2018

(30) Foreign Application Priority Data

Nov. 4, 2016 (GB) ..................... 1618636
Mar. 28, 2017 (GB) ..................... 1704971

(51) Int. Cl.
| A47B 57/00 | (2006.01) |
| A47G 19/00 | (2006.01) |
| A21C 15/02 | (2006.01) |
| F16B 13/00 | (2006.01) |
| A47G 19/30 | (2006.01) |
| F16B 1/00 | (2006.01) |
| F16B 15/00 | (2006.01) |

(52) U.S. Cl.
CPC ............ *A47G 19/00* (2013.01); *A21C 15/02* (2013.01); *A47G 19/30* (2013.01); *F16B 1/0071* (2013.01); *F16B 13/002* (2013.01); *F16B 15/00* (2013.01)

(58) Field of Classification Search
CPC ......... A47G 19/30; A47G 19/00; A21C 15/00
USPC ....... 248/542, 354.6; 108/101; 426/383, 132
See application file for complete search history.

(56) References Cited

U.S. PATENT DOCUMENTS

| 2,902,174 | A |  | 9/1959 | Audsley |  |
| 3,690,610 | A | * | 9/1972 | Peirce | A21B 3/00 108/101 |
| 4,069,772 | A | * | 1/1978 | Haapala | A21C 15/002 108/94 |
| 5,165,637 | A | * | 11/1992 | Polley | A21C 15/00 108/101 |
| 6,584,697 | B1 | * | 7/2003 | Guoan | G01C 15/06 33/293 |
| 8,196,879 | B2 | * | 6/2012 | Vezina | A47G 19/00 108/101 |
| 8,490,553 | B1 | * | 7/2013 | English | A47G 19/00 108/101 |
| 8,516,967 | B2 | * | 8/2013 | Jeffery | A21C 15/00 108/101 |
| 10,130,199 | B2 | * | 11/2018 | Deszcz | A47F 5/01 |
| 2010/0200722 | A1 |  | 8/2010 | Vezina et al. |  |

FOREIGN PATENT DOCUMENTS

CN 103376034 A 10/2013
WO WO 2016/061557 A1 4/2016

OTHER PUBLICATIONS

Intellectual Property Office, Combined Search and Examination Report, GB1704971.9 (dated Sep. 18, 2017).

* cited by examiner

*Primary Examiner* — Todd M Epps
(74) *Attorney, Agent, or Firm* — Walters & Wasylyna LLC

(57) ABSTRACT

An internal cake support device for forming a multi-tiered cake. The device comprises a shaft having a first end and a second end and a head is provided at a first end. The device comprises a first measurement scale for measuring a linear dimension from the second end of the shaft. The device comprises a second measurement scale for measuring a linear dimension from the first end of the shaft.

27 Claims, 11 Drawing Sheets

FOODSTUFF SUPPORT DEVICE

PRIORITY

This application claims priority from GB1618636.3 filed on Nov. 4, 2016, and GB1704971.9 filed on Mar. 28, 2017. The entire contents of GB1618636.3 and GB1704971.9 are incorporated herein by reference.

FIELD

The present invention relates to a support device for use with foodstuffs or baked goods such as, but not limited to, cakes. More specifically, but not exclusively, the invention relates to internal support devices for multi-tiered cakes and to a method of use. More particularly, but not exclusively, the invention relates to a plastic dowel having at least one indicia for facilitating adjustment of the length of the device.

BACKGROUND

Dowels are commonly used by bakers as internal supports for cakes having multiple layers or tiers, such as wedding cakes, to prevent the cakes from collapsing under the weight of the upper tiers, particularly during transit of such cakes. The conventional method for assembling a multi-tiered cake is to first place each tier of the cake on a cardboard base. Then, dowels are measured and cut into lengths equal to the height of the first tier. Next, dowels are inserted vertically around the centre of the first tier so that the bottoms of the dowels make contact with the cardboard base under the first tier and so that the tops of the dowels are flush with the top of the first tier. Then, the second tier is placed on top of the first tier so that the cardboard base of the second tier is resting on the tops of the dowels. This process is then repeated for each additional tier that is to be added to the cake. A problem with the conventional method, and specifically with the dowels, is that the dowels are hard to cut. In fact, the wooden dowels cannot be cut with scissors and must be cut with a saw and then sanded to prevent splinters.

A further problem with known dowels is the large diameter of the dowels required for larger cakes, which decreases the amount of cake available and leaves unsightly vertical holes in the cake after the cake is dismantled to be served and eaten.

An even further problem is that cakes generally require a plurality of dowels to support the upper tiers. If each of the dowels is not cut to substantially the same length then the cake may appear lopsided or out of plumb.

Therefore, a need exists for sanitary dowels that are easy to cut and can hold a heavy load when being used to support a multi-tiered cake. In addition, a need exists for a dowel that can be readily adjusted to a desired length.

It is desirable to provide a simplified method for creating a multi-tiered cake.

The present disclosure seeks to overcome or at least mitigate the problems of the prior art.

SUMMARY

An aspect of the disclosure provides an internal cake support device for forming a multi-tiered cake comprising a shaft having a first end, a second end and at least one face. At least a first portion of the at least one face comprises a first measurement scale for measuring a linear dimension from the second end of the shaft. At least a second portion of the at least one face comprises a second measurement scale for measuring a linear dimension from the first end of the shaft.

Another aspect of the disclosure provides an internal cake support device for forming a multi-tiered cake comprising a shaft having a first end, a second end, a first face and a second face. At least a portion of the first face comprises a first measurement scale for measuring a linear dimension from the second end of the shaft. At least a portion of the second face comprises a second measurement scale for measuring a linear dimension from the first end of the shaft.

Optionally, the second face comprises a first reinforcing member disposed at least in part in opposition to said portion of the first face comprising the first measurement scale.

Optionally, the first face comprises a second reinforcing member disposed at least in part in opposition to said portion of the second face comprising the second measurement scale.

Yet another aspect of the disclosure provides an internal cake support device for forming a multi-tiered cake comprising a shaft having a first end and a second end. A head may be mounted to the first end. The device comprises a first measurement scale for measuring a linear dimension from the second end of the shaft. The device comprises a second measurement scale for measuring a linear dimension from the first end of the shaft.

Optionally, the first measurement scale is integrally formed with the shaft.

Optionally, the second measurement scale is integrally formed with the shaft.

Optionally, the shaft comprises a first face upon which the first measurement scale is provided.

Optionally, the first and second measurement scales each comprise numeric reference signs.

Optionally, the first and second measurement scales each comprise alphabetic reference signs.

Optionally, the first and second measurement scales each comprise symbolic reference signs.

Optionally, the first and second measurement scales each employ geometric shapes as reference signs.

Optionally, the shaft comprises a second face upon which the first measurement scale is provided.

Optionally, the shaft comprises a third face providing a display region for the display of information.

Optionally, the shaft comprises a substantially triangular cross-sectional shape.

Optionally, the second end of the shaft comprises a point for facilitating insertion into a tier of cake.

A further aspect of the disclosure provides a support device for use with multi-tiered foodstuffs comprising a shaft having a first end and a second end. A head may be mounted to the first end. The device comprises a first measurement scale for measuring a linear dimension from the second end of the shaft. The device may comprise a cutting guide configured for slidable mounting upon the shaft.

Optionally, the device comprises a second measurement scale for measuring a linear dimension from the first end of the shaft.

A still further aspect of the disclosure provides a foodstuff support system for use when forming a multi-tiered foodstuff. The system comprises a first device including a shaft having a first end and a second end. A head may be mounted to the first end. The first device comprises a first measurement scale for measuring a linear dimension from the second end of the shaft. The system comprises a cutting guide slidably mountable upon the shaft of the first device. The system further comprises at least one second device. Each at least one second device includes a shaft having a first end and a second end. A head may be mounted to the first end of the second device.

Each at least one second device comprises a second measurement scale for measuring a linear dimension from the first end of the shaft of the second device.

Yet another aspect of the disclosure provides a method for forming a multi-tiered cake comprising:

inserting an internal cake support device into a first tier of a cake, the device comprising a shaft having a first end and a second end, a head may be mounted to the first end, a first measurement scale for measuring a linear dimension from the second end of the shaft and a second measurement scale for measuring a linear dimension from the first end of the shaft;

determining a first distance along the shaft between the first end of the device and an upper surface of the first tier of the cake using the second measurement scale;

removing the internal cake support device from the first tier of a cake;

measuring the first distance from a second end along a shaft of at least one further internal cake support device using a first measurement scale provided thereon to determine a cutting position;

cutting the shaft of each at least one further internal cake support device at the cutting position;

inserting each at least one further internal cake support device into the first tier of a cake.

Still yet another aspect of the disclosure provides a method for forming a multi-tiered cake comprising:

inserting an internal cake support device into a first tier of a cake, the device comprising a shaft having a first end and a second end, a head may be mounted to the first end, a first measurement scale for measuring a linear dimension from the second end of the shaft and a second measurement scale for measuring a linear dimension from the first end of the shaft;

determining a first distance along the shaft between the first end of the device and an upper surface of the first tier of the cake using the second measurement scale;

measuring the first distance along the shaft from the second end of the device using the first measurement scale to determine a cutting position;

removing the internal cake support device from the first tier of a cake;

cutting the shaft at the cutting position;

reinserting the internal cake support device into the first tier of a cake.

A further aspect of the disclosure provides a method for forming a multi-tiered cake comprising:

inserting an internal cake support device into a first tier of a cake, the device comprising a shaft having a first end and a second end, a head may be mounted to the first end, a first measurement scale for measuring a linear dimension from the second end of the shaft and a second measurement scale for measuring a linear dimension from the first end of the shaft;

determining a first distance along the shaft between the first end of the device and an upper surface of the first tier of the cake using the second measurement scale;

removing the internal cake support device from the first tier of a cake;

selecting at least one further internal cake support device comprising a shaft having a first end and a second end,
a head mounted to the first end and a first measurement scale for measuring a linear dimension from the second end of the shaft;

measuring the first distance from the second end of the device along the shaft of said at least one further internal cake support device using the first measurement scale to determine a cutting position;

cutting the shaft of each at least one further internal cake support device at the cutting position;

inserting each at least one further internal cake support device into the first tier of a cake.

Other aspects of the disclosure provide an internal cake support device for forming a multi-tiered cake comprising a shaft having a first end and a second end. The device comprises a first measurement scale for measuring a linear dimension from the second end of the shaft. The device comprises a second measurement scale for measuring a linear dimension from the first end of the shaft.

Optionally, the first end forms a head for receiving an upper tier. The head may be mounted to the first end of the shaft, or integrally formed with the shaft at the first end.

An aspect of the present disclosure provides an internal cake support device for forming a multi-tiered cake comprising a shaft having a first end and a second end and comprising at least one face wherein at least a portion of the at least one face comprises a first measurement scale for measuring a linear dimension from the first end of the shaft.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the disclosure will now be described with reference to the accompanying drawings, in which.

DETAILED DESCRIPTION

Figure 1:
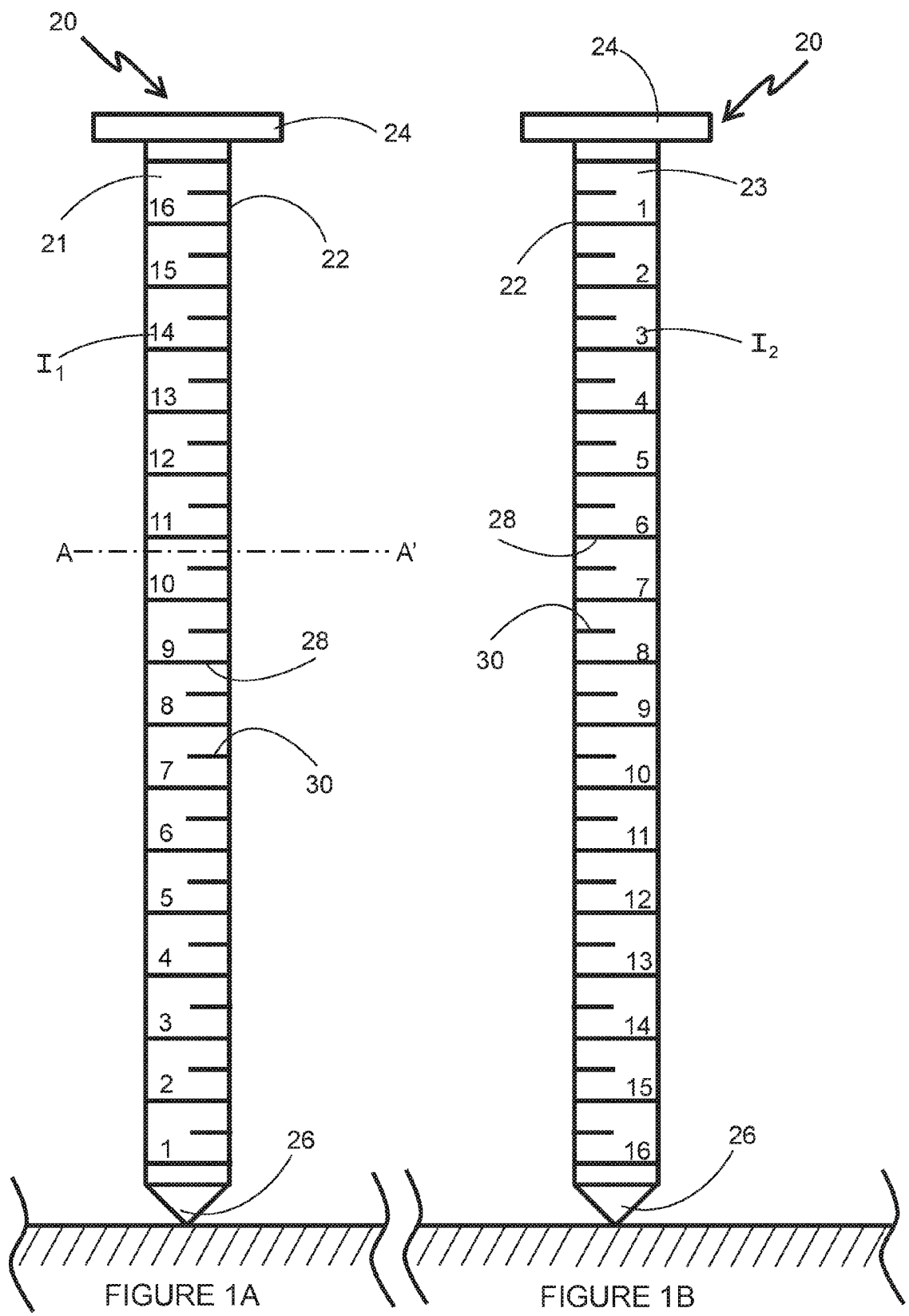
FIGS. 1A and 1B are first and second side views of a cake support device according to a first embodiment of the disclosure.

Detailed descriptions of specific embodiments of the device and method are disclosed herein. It will be understood that the disclosed embodiments are merely examples of the way in which certain aspects of the disclosure can be implemented and do not represent an exhaustive list of all of the ways the disclosure may be embodied. As used herein, the word "exemplary" is used expansively to refer to embodiments that serve as illustrations, specimens, models, or patterns. Indeed, it will be understood that the device and method described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Referring to FIGS. 1A and 1B, a first side view and a second side view, respectively, of a cake support device 20 of the present disclosure, are shown. The cake support device 20 comprises a shaft 22; the shaft 22 is substantially elongate in shape. A head 24 is mounted to a first, upper, end of the shaft 22. A second, lower, end of the shaft is tapered or chamfered to a point 26. The point 26 facilitates insertion of the cake support device 20 into a foodstuff such as baked foodstuff or cake, see FIG. 2. In some embodiments, the head 24 and shaft 22 are integrally formed as a unitary piece.

The cake support device 20 may be formed from a plastics material, preferably a food grade plastic such as, but not limited to, polyethylene, HDPE or polypropylene.

The cake support device 20 may be formed by injection moulding. In such embodiments, a plurality of cake support devices 20 may be formed simultaneously. Each of the plurality of cake support devices 20 may be coupled to a frame or runner (not shown). Each of the plurality of cake support devices 20 may be frangibly connected to the frame or runner. In some embodiments, the plurality of cake support devices 20 may be shipped or distributed whilst connected to the runner. In such embodiments, the runner may comprise a display region for the display of product information or branding. In other embodiments, each of the plurality of cake support devices 20 may be separated from the runner prior to packaging and shipping.

Figure 5A:
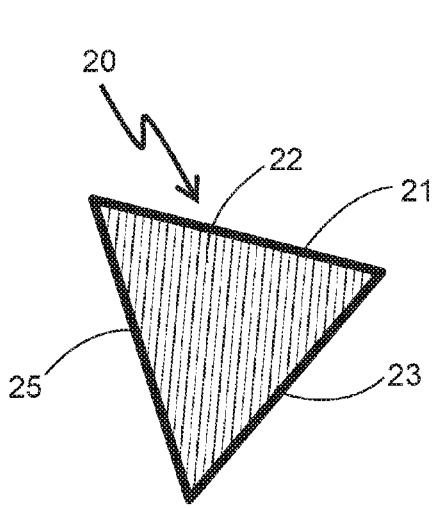
FIG. 5A is a cross-sectional view of the device of FIG. 1A along line A-A'.

The cake support device 20 shown in FIG. 1 has a substantially triangular cross-sectional shape, see FIG. 5A.

The cake support device 20 comprises a top end defined by the head 24, a bottom end defined by the point 26 in FIGS. 1A and 1B, and an outer surface having faces 21, 23, 25.

A first face 21 of the shaft 22 shown in FIG. 1A comprises a first indicia $I_1$. A second face 23 of the shaft 22 shown in FIG. 1B comprises a second indicia $I_2$. A third face 23 of the shaft 22 shown in FIG. 5A provides a display region for the display of information or further indicia. For example, but not limited to, the third face 23 may provide an advertising or branding region for displaying a product name or manufacturer name. Alternatively, it may display operating or assembly instructions, legal information or regulatory compliance data concerning the product.

The first indicia $I_1$ comprises a plurality of major guides, graduations or marks 28 and a plurality of minor guides, graduations or marks 30. Each of the major graduations 28 is spaced apart from its adjacent neighbours. Each of the spacings between pairs of major graduations 28 is substantially equal in size. Each of the minor graduations 30 is spaced apart from its adjacent neighbours. Each of the spacings between pairs of minor graduations 30 is substantially equal in size.

In the illustrated embodiment, a single minor graduation 30 is provided between a pair of major graduations 28. The single minor graduation 30 is spaced equidistantly apart from each of the pair of major graduations 28. In other embodiments, more than one minor graduation 30 may be provided between a pair of major graduations 28.

Each of the major graduations 28 comprises, or is associated with, an identifier. The identifiers are arranged in a sequence. In this illustrated embodiment, the first face 21 comprises a series of numeric identifiers. The series of numeric identifiers follows an arithmetic progression having a common difference of 1. The series of numeric identifiers commences at the lower or second end of the cake support device and increases towards the first end.

The first indicia $I_1$ forms a first measurement scale for measuring an amount of the cake support device to be removed such that the cake support device is substantially equal in height to a tier of a cake.

The second indicia $I_2$ comprises a plurality of major guides, graduations or marks 28 and a plurality of minor guides, graduations or marks 30. Each of the major graduations 28 is spaced apart from its adjacent neighbours. Each of the spacings between the pairs of major graduations 28 is substantially equal in size. Each of the minor graduations 30 is spaced apart from its adjacent neighbours. Each of the spacings between the pairs of minor graduations 30 is substantially equal in size.

Figure 2:
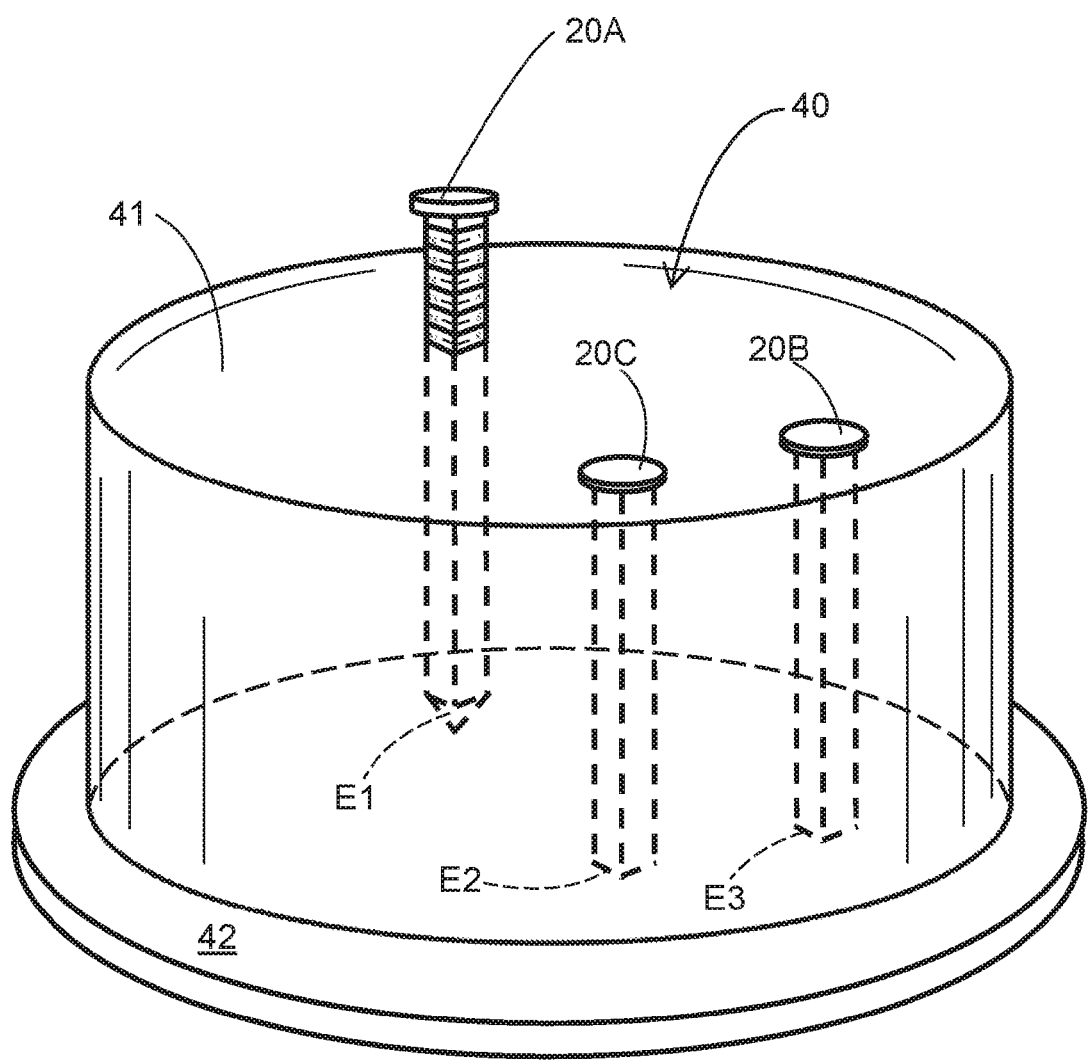
FIGS. 2 to 4B illustrate stages of construction of a multi-tiered cake employing the device of FIGS. 1A and 1B.

Each of the major graduations 28 of the second indicia $I_2$ is aligned with a respective one of the major graduations 28 of the first indicia $I_1$, best illustrated in FIG. 2. Similarly, each of the minor graduations 30 of the second indicia $I_2$ is aligned with a respective one of the minor graduations 30 of the first indicia $I_1$.

Similarly, to the first indicia $I_1$, the second indicia $I_2$ comprises a single minor graduation 30 between a pair of major graduations 28. The single minor graduation 30 is spaced equidistantly apart from each of the pair of major graduations 28. In other embodiments, more than one minor graduation 30 may be provided between a pair of major graduations 28.

Each of the major graduations 28 comprises, or is associated with, an identifier. The identifiers are arranged in a sequence. In this illustrated embodiment, the second face 23 comprises a series of numeric identifiers. The series of numeric identifiers follows an arithmetic progression having a common difference of 1. The series of numeric identifiers commences at the upper or first end of the cake support device and increases towards the second end.

The second indicia $I_2$ forms a second measurement scale for measuring an amount of the cake support device to be removed such that the cake support device is substantially equal in height to a tier of a cake. The second measurement scale is inverted with respect to the first measurement scale.

The numeric sequence of each of the first and second indicia commences at a common number; that is to say they both start at number "1".

It will be appreciated that the first and second indicia $I_1$, $I_2$ comprise the same arithmetic sequence or progression, the direction of the arithmetic progression of the second indicia $I_2$ being reversed or inverted with respect to the direction of the arithmetic progression of the first indicia $I_1$.

In alternative embodiments, the numeric sequence may be replaced with an alternative sequence of reference signs for example, but not limited to, an alphabetic sequence, a sequence of geometric shapes or other symbols. References herein to "measurement scale" should not be interpreted as being limited to numeric scales, the scale may employ some or all the letter of the alphabet, an individual letter being associated with a major or minor graduation 28, 30. For example, but not limited to, the scale may employ or display a pangram such as "The quick brown fox jumps over the lazy dog", other embodiments may employ a heterogram, (a sentence in which no letter of the alphabet occurs more than once.

In some embodiments, the first and second indicia $I_1$, $I_2$ may employ, or at least substantially correspond to, a known system for measuring units of length, for example metric (mm, cm) or imperial (inches) units of length.

The linear distance between the second end of the cake support device 20, defined by the point 26, and the first, lowermost, graduation 28, 30 of the second indicia $I_2$ is the same as the linear distance between the first end of the cake support device 20, defined by the upper surface of the head 24 and the first, uppermost, graduation 28, 30 of the first indicia $I_1$.

FIG. 2 illustrates a stage of construction of a multi-tiered cake. A first tier 40 of the multi-tiered cake is shown with a plurality of cake support devices 20 inserted therein.

Figure 3:
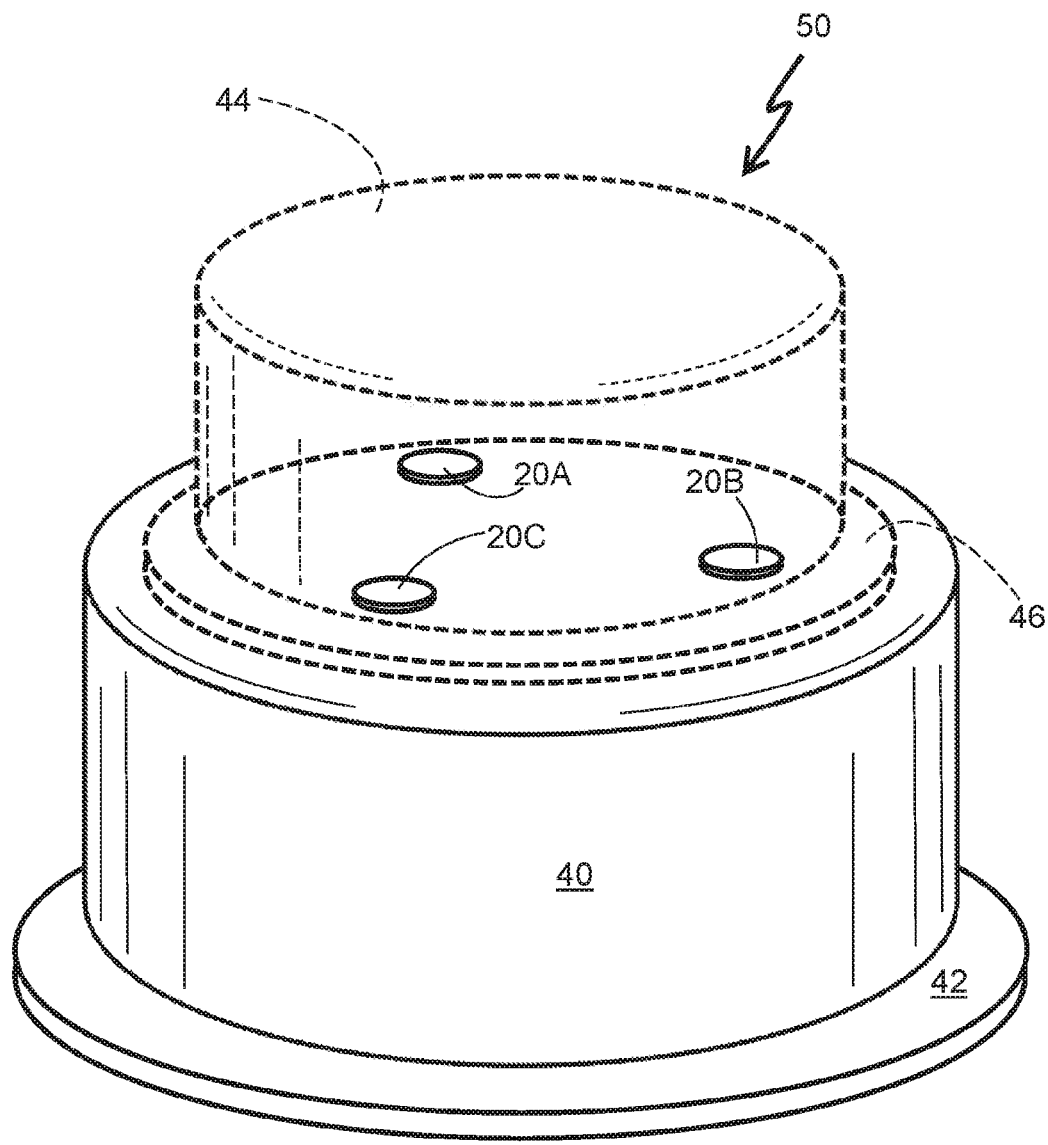

The method for assembling a multi-tiered cake 50 (see FIG. 3) may include the step of placing each tier 40, 44 of the cake upon a respective base or board 42, 46.

Then, a first cake support device 20A is inserted into the first (lower) tier. It is envisaged that the cake support device 20A will need to be adjusted in length such that the head 24 is disposed in close proximity to the upper surface of the first tier 40. Optionally, the upper surface of the head 24 will be arranged to be substantially flush with the upper surface 41 of the first tier 40.

The first and second indicia $I_1$, $I_2$ provide a simple means by which the baker can determine the excess length of material which needs to be cut from each cake support device 20. The baker inserts a cake support device 20A into the upper surface 41 of the first tier 40 of the cake until lower end E1 (defined by point 26) makes contact with the upper surface of the base 42. The baker can read the second indicia $I_2$ to determine the length of material which needs to be removed, see FIG. 4B. The upper surface 41 of the first tier 40 of the cake is aligned with a given reference point on the second indicia $I_2$. This provides the baker with information indicative of the length of the shaft 22 to be removed. The baker can then employ the first indicia $I_1$ to determine the correct distance from the second end (point 26) of the shaft 22 of each cake support device 20 to cut through the shaft 22. A tool such as a pair of shears may be placed at the corresponding point on the first indicia $I_1$ as was read from the second indicia $I_2$.

Figure 4A:
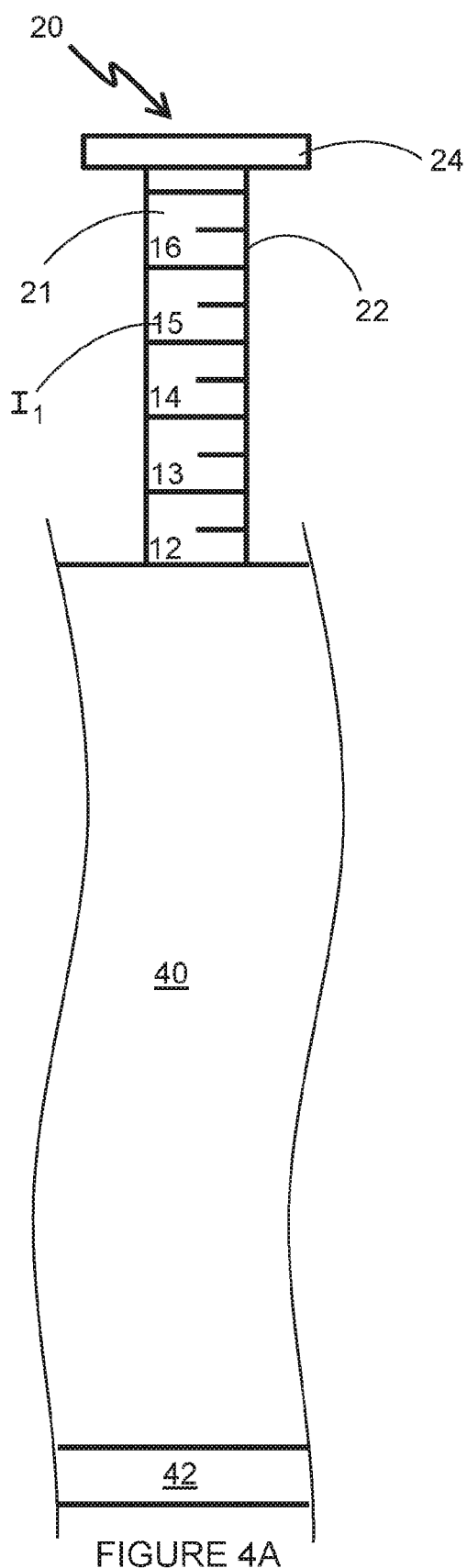
Figure 4B:
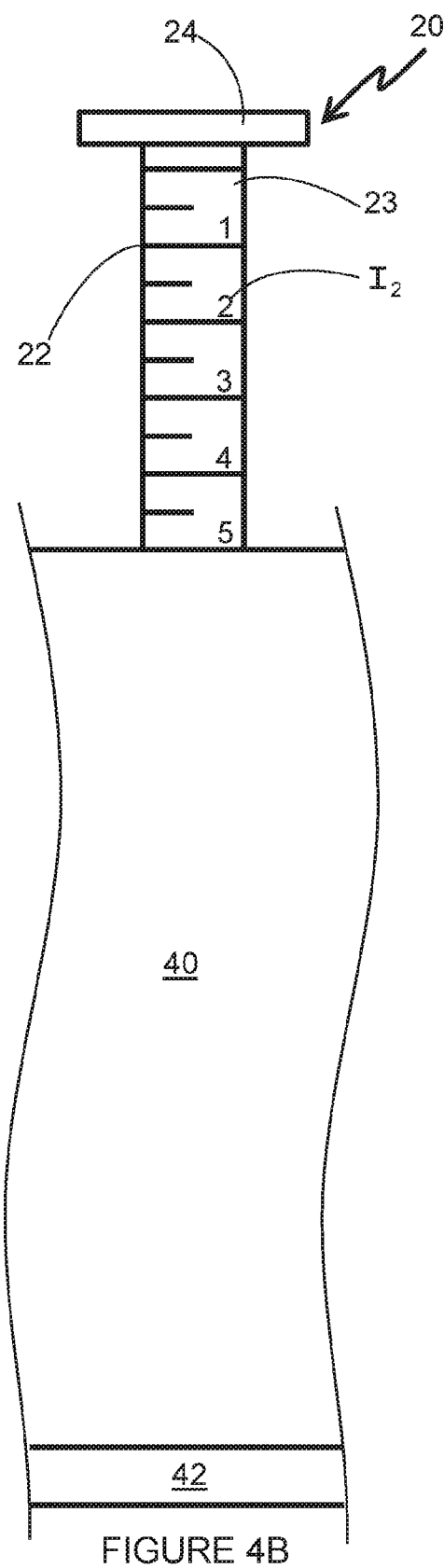

In the example illustrated in FIG. 4B, it is depicted that the upper surface of the first tier 40 of the cake reaches the graduation 28 of the second indicia $I_2$ identified by the reference "5". This indicated that the shaft 22 should be cut at the graduation 28 of the first indicia $I_1$ identified by the reference "5".

The baker can insert the shortened cake support devices 20B, 20C vertically into the first tier 40 of the cake. The cut end E2 of the shaft 22 of each cake support device 20B, 20C is disposed in contact with the base 42. The cake support device 20A is removed and similarly shortened and reinserted into the first tier 40 of the cake, preferably using the hole previously made.

When the required number of shortened cake support devices 20A, 20B, 20C have been inserted into the first tier 40 of the cake the next tier 44 of the cake can be placed upon the first tier 40 and is supported by cake support devices 20A, 20B, 20C. This process is then repeated for each additional tier that is to be added to the cake 50. In this way, an upper tier rests upon the first tier and is supported by the cake support devices 20A, 20B, 20C. A lower surface of an upper base 46 is in contact with the upper, first ends of the cake support devices 20A, 20B, 20C. The lower, second, ends of the cake support devices 20A, 20B, 20C are in contact with an upper surface of the lower base 42. The cake support devices 20A, 20B, 20C form pillars or columns between the upper and lower bases 46, 42.

Whilst the illustrated embodiment shows three cake support devices 20A, 20B, 20C being employed it is envisaged that any suitable number of cake support devices 20A, 20B, 20C may be used. This may be dependent upon the size of the cake and the weight or type of cake being constructed.

In some embodiments, each cake support device 20A, 20B, 20C may be individually inserted into the first tier 40 of the cake. The baker can determine the requisite length of each cake support device 20A, 20B, 20C, remove each cake support device 20A, 20B, 20C, cut each cake support device 20A, 20B, 20C and reinsert each cake support device 20A, 20B, 20C.

The cake support device 20 may be constructed from a brightly coloured plastic that will allow a user to easily find the cake support device 20 when disassembling and serving a multi-tiered cake.

Figure 5B:
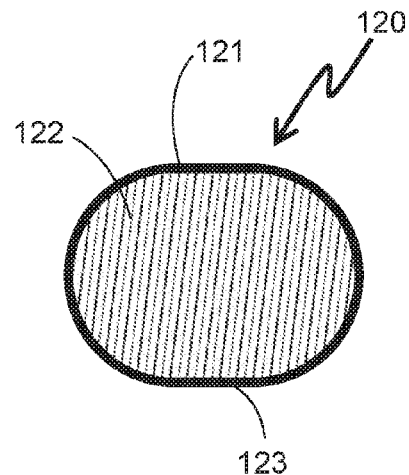
FIGS. 5B to 5E are cross-sectional views of devices according to further embodiments of the disclosure.
Figure 5C:
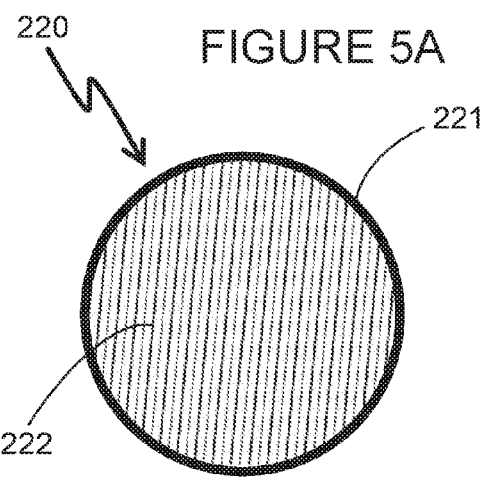
Figure 5D:
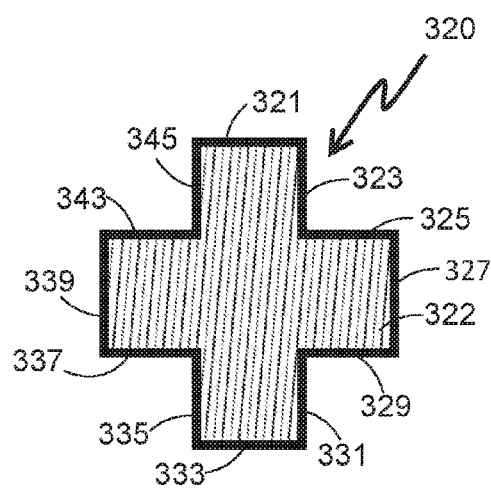
Figure 5E:
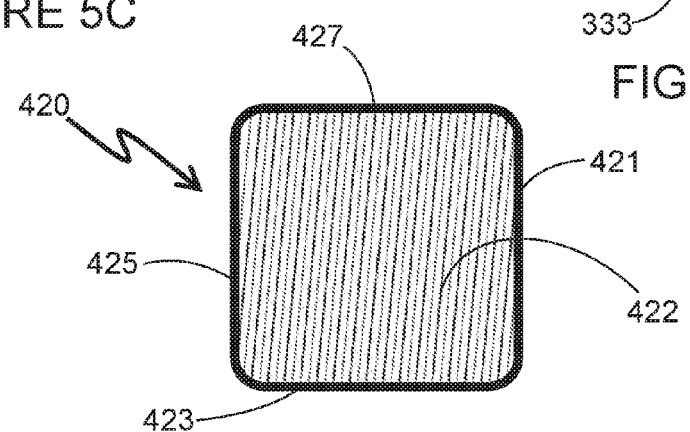

In other embodiments, the cake support device 20 may be any geometric shape, such as a rectangle, circle, octagon, etc. FIGS. 5B to 5E show alternative embodiments. In FIG. 5B the cake support device 120 comprises a shaft 122 having a stadium shaped cross-sectional shape, that is to say the cake support device 120 comprises two opposed arcuate ends and two opposed flat parallel sides. The flat surfaces 121, 123 provide a display region for the display of indicia. In FIG. 5C the cake support device 220 comprises a shaft 222 having a circular cross-sectional shape. In FIG. 5D the cake support device 320 comprises a shaft 322 having a cruciform shaped cross-sectional shape. The cake support device 320 comprises a plurality of surfaces 321, 323, 325, 327, 329, 331, 333, 335, 337, 339, 343, 345, each of which provides a display region for the display of indicia. In FIG. 5E the cake support device 420 comprises a shaft 422 having a square or rectangular cross-sectional shape. The cake support device 420 may comprise rounded corners, and provides a plurality of surfaces 421, 423, 425, 427 for forming display regions for the display of indicia.

Figure 6:
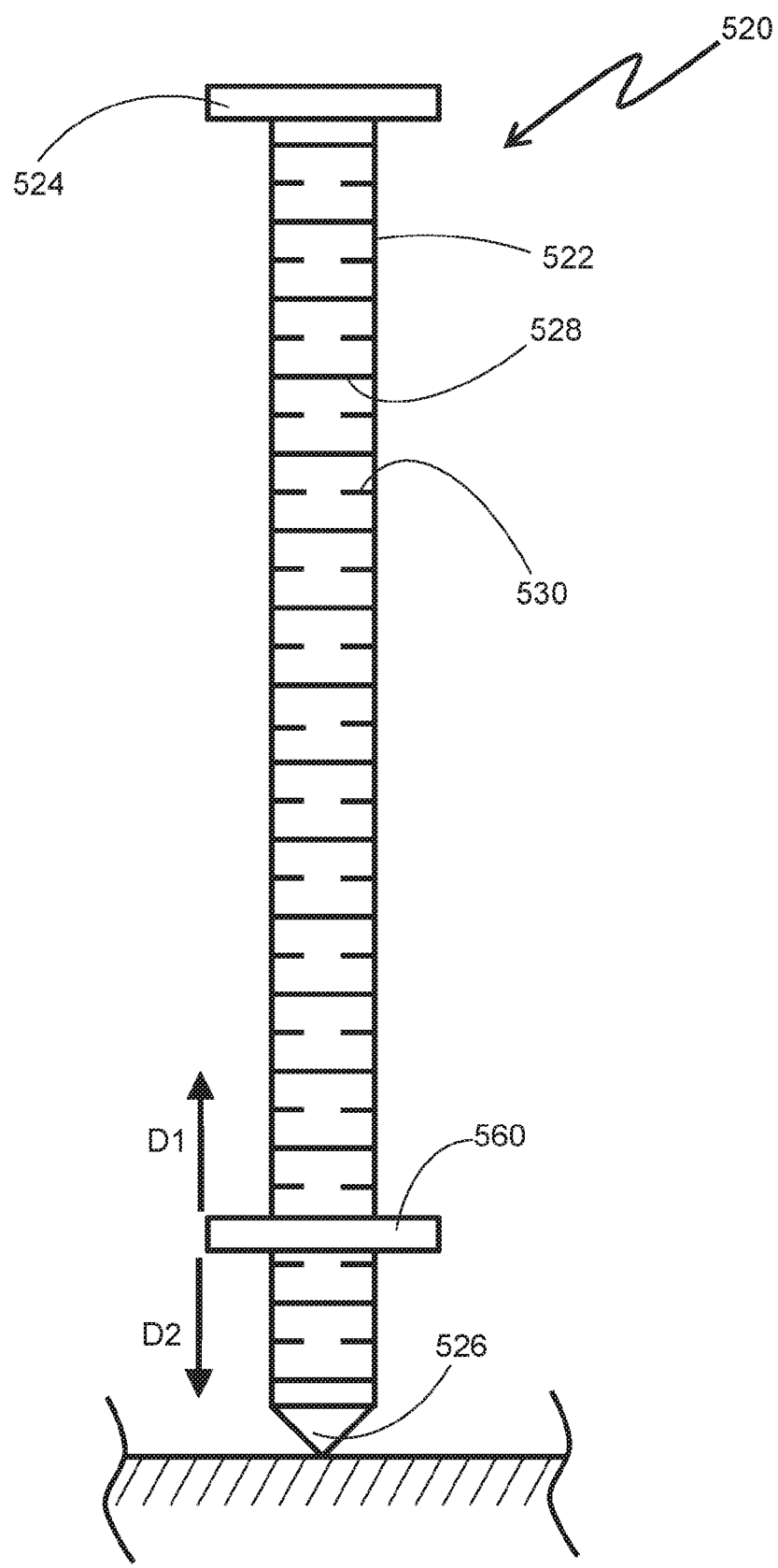
FIG. 6 is a side view of a cake support device according to yet another embodiment of the disclosure.
Figure 7:
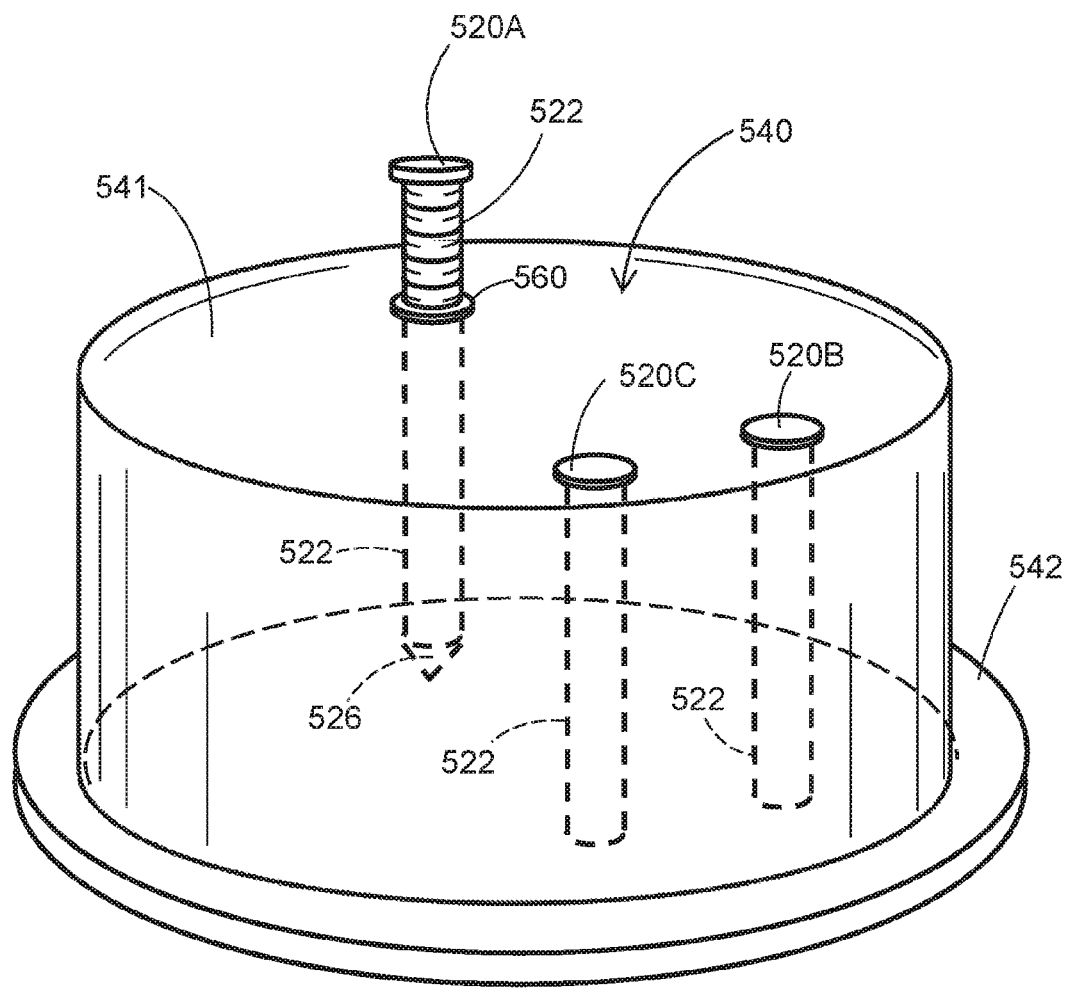
FIG. 7 illustrates a stage of construction of a multi-tiered cake using the device of FIG. 6.
Figure 8A:
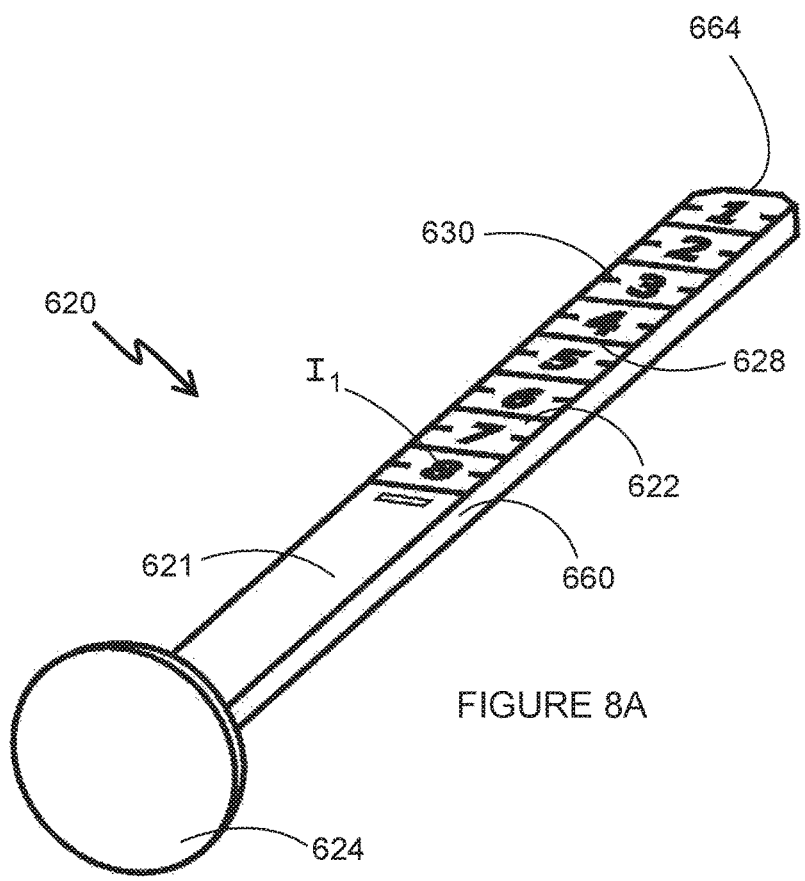
FIG. 8A is a perspective view of a cake support device according to a still yet another embodiment of the disclosure.
Figure 8B:
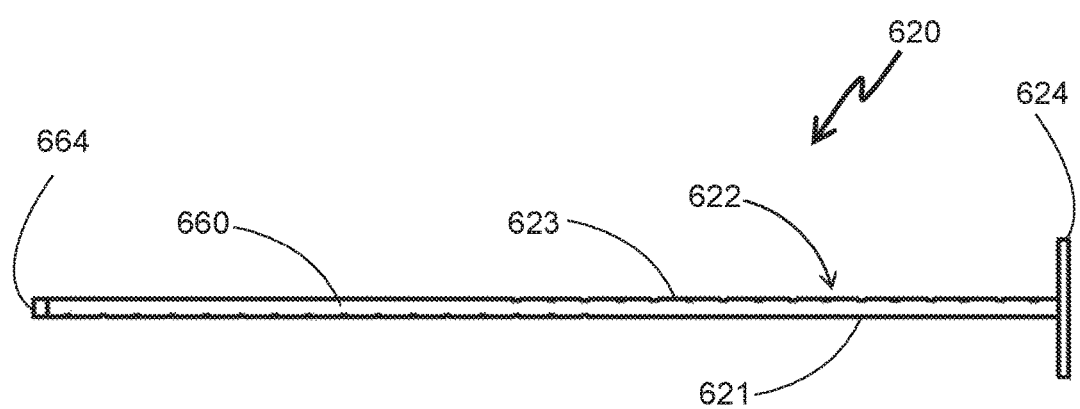
FIG. 8B is an end view of the cake support device of FIG. 8A.

Referring now to FIGS. 6 and 7, there is shown an additional embodiment of the present disclosure. In the sixth illustrated embodiment like numerals have, where possible, been used to denote like parts, albeit with the addition of the prefix "500" to indicate that these features belong to the sixth embodiment. The additional embodiment shares many common features with the previous embodiment and therefore only the differences from the embodiment illustrated in FIGS. 1 to 5E will be described in detail.

The cake support device 520 comprises a shaft 522. The shaft 522 is substantially elongate in shape. A head 524 is mounted to a first, upper, end of the shaft 522. A second, lower, end of the shaft is tapered or chamfered to a point 526. The point 526 facilitates insertion of the cake support device 520 into a cake 540, see FIG. 7.

The shaft 522 may optionally comprise a plurality of major graduations 528 and a plurality of minor graduations 530 and at least one series of references numerals. A measurement guide or cutting guide 560 is slidably mounted upon the shaft 522.

When the cake support device 520 is inserted into the first tier 540 of the cake through the upper surface 541, as shown in FIG. 7, the cutting guide 560 makes contact with the upper surface 541. Thereafter the cutting guide 560 moves with respect to the cake support device 520. The cutting guide 560 slides along the shaft 522 until the second end of the shaft 522, defined by the point 526, contacts the support surface of the base 542. The cutting guide 560 serves to mark or record the length of material to be removed from the shaft 522. In this way, the cutting guide 560 remains in position upon the shaft 522 after removal of the cake support device 520 from the cake. In addition to recording a length of material to be removed the cutting guide may facilitate cutting, the user may align a cutting tool with the cutting guide to ensure the shaft 52 is cut to form a square end.

In some embodiments, the cake support device 520A illustrated in FIG. 7 may comprise first and second indicia, the second indicia being arranged in an inverted direction to the first indicia, as described above in relation to the embodiment of FIGS. 1A and 1B.

In other embodiments, a first cake support device 520A may comprise a single indicia arranged similarly to the second indicia $I_2$ of the embodiment of FIG. 1B. Further cake support devices 520B, 520C may comprise a single indicia arranged similarly to the first indicia $I_1$ of the embodiment of FIG. 1A. The further cake support devices 520B, 520C may be cut to length based upon the measurement recorded by the first cake support device 520A. Once the further cake support devices 520B, 520C have been prepared and inserted into the cake, the first cake support device 520A is then cut to length and reinserted into the cake. In other embodiments, the first cake support device 520A may be preserved (in an uncut state) as a measurement device; one of the further cake support devices 520B, 520C may be inserted into the void created by removal of the first cake support device 520A. The first cake support device 520A may be formed from a different coloured plastic material to the further cake support devices 520B, 520C so as to enable it to be readily identified. In other embodiments, the first cake support device 520A may be otherwise distinguishable from the further cake support devices 520B, 520C. For example, but not limited to, the head 524 or shaft 522 or both the head 524 and shaft 522 may be shaped or sized differently to the head 524 or shaft 522 of the further cake support devices 520B, 520C.

Referring now to FIGS. 8A to 9B, there is shown a further embodiment of the present disclosure. In the seventh illustrated embodiment like numerals have, where possible, been used to denote like parts, albeit with the addition of the prefix "600" to indicate that these features belong to the seventh embodiment. The further embodiment shares many common features with the previous embodiments and therefore only the differences from the embodiments illustrated in FIGS. 1 to 7 will be described in detail.

Figure 9A:
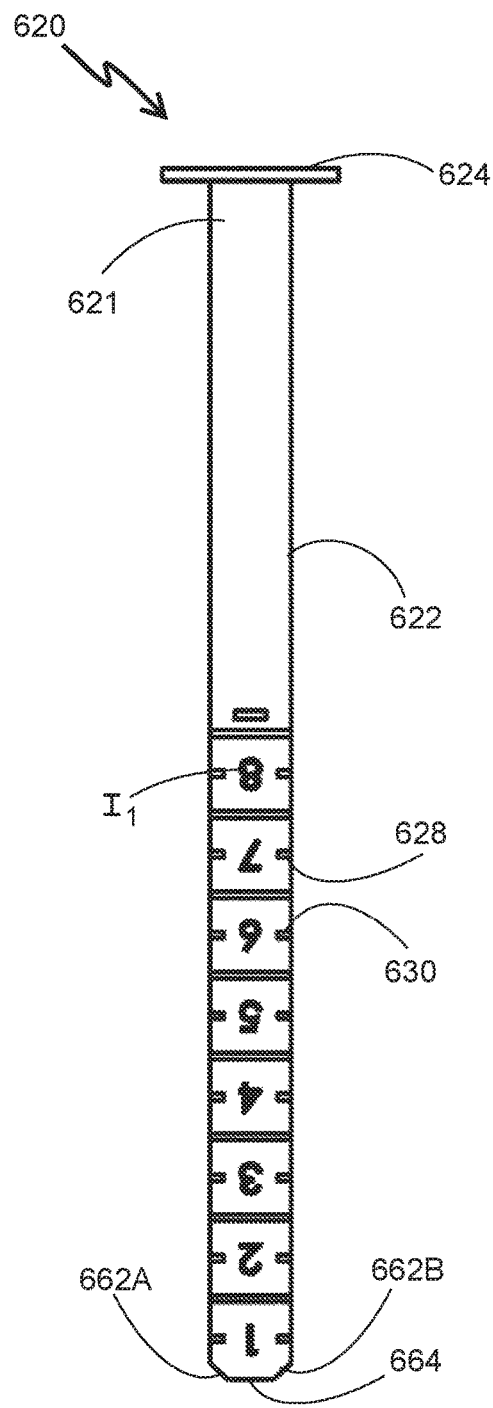
FIGS. 9A and 9B are first and second side views of the cake support device of FIG. 8A.
Figure 9B:
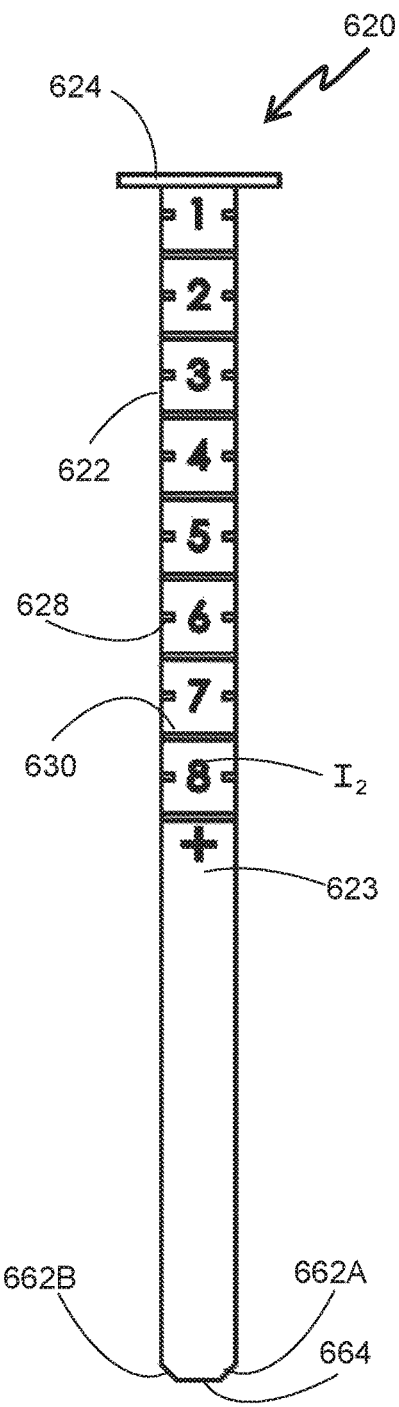

In FIGS. 9A and 9B a first side view and a second side view, respectively, of a cake support device 620 of the present disclosure are shown. The cake support device 620 comprises a shaft 622; the shaft 622 is substantially elongate in shape. A head 624 is provided at a first, upper, end of the shaft 622. A second, lower, end 664 of the shaft 622 comprises opposing chamfered corners 662A, 662B to as to reduce the width of the shaft 622 towards the second end 664. This facilitates insertion of the cake support device 620 into a foodstuff such as baked foodstuff or cake. The second end of the cake support device 620 of the seventh embodiment comprises a blunt or flat second end. The may allow more accurate and reliable measurements to be made. It may also reduce the likelihood of the cake support device penetrating a support surface, such as, but not limited to a cake board, upon which the tier of cake is placed.

In some embodiments, the head 624 and shaft 622 are integrally formed as a unitary piece. In other embodiments, the head 624 may be formed as separate component mountable upon the shaft 622. In other embodiments where the head 624 is omitted or is of the same dimension (width, diameter or area) as the shaft 622, the opposing chamfered corners 662A, 662B (or point 26) may serve to identify the first end from the second end, by virtue of the opposing chamfered corners 662A, 662B (or point 26) being absent from the first end.

In other embodiments, the opposing chamfered corners 662A, 662B (or point 26) are omitted from the second end such that the device 620 symmetrical. In such embodiments, only one measurement scale may be provided on one face of the shaft 622.

The head 624 is wider than the shaft 622 to provide an increased area for receiving an upper tier of a cake, in some embodiments the head 624 may be omitted or may be similar in dimension to the shaft 622. The head 624 takes the form of a flat disc, however in other embodiments other shapes may be employed.

The cake support device 620 shown in FIGS. 8A to 9B has a substantially rectangular cross-sectional shape.

The cake support device 620 comprises a top end defined by the head 624, a bottom end 664, the shaft comprises four faces, two opposing major faces 621, 623 and two opposing minor faces 660.

A first major face 621 of the shaft 622 shown in FIG. 9A comprises a first indicia $I_1$. A second face 623 of the shaft 622 shown in FIG. 9B comprises a second indicia $I_2$.

The first indicia $I_1$ comprises a plurality of major guides, graduations or marks 628 and a plurality of minor guides, graduations or marks 630. Each of the major graduations 628 is spaced apart from its adjacent neighbours. Each of the spacings between pairs of major graduations 628 is substantially equal in size. Each of the minor graduations 630 is spaced apart from its adjacent neighbours. Each of the spacings between pairs of minor graduations 630 is substantially equal in size.

In the illustrated embodiment, a single minor graduation 630 is provided between a pair of major graduations 628. The single minor graduation 630 is spaced equidistantly apart from each of the pair of major graduations 628. In other embodiments, more than one minor graduation 630 may be provided between a pair of major graduations 628.

Each of the major graduations 628 comprises, or is associated with, an identifier. The identifiers are arranged in a sequence. In this illustrated embodiment, the first face 621 comprises a series of numeric identifiers. The series of numeric identifiers follows an arithmetic progression having a common difference of 1. The series of numeric identifiers commences at the lower or second end of the cake support device and increases towards the first end. Each numeric identifier interrupts or overlies a respective one of the major graduations 628. Only a lower portion of the first face 621 of the shaft 622 is provided with the first indicia $I_1$.

The first indicia $I_1$ forms a first measurement scale for measuring an amount of the cake support device to be removed such that the cake support device is substantially equal in height to a tier of a cake.

The second indicia $I_2$ comprises a plurality of major guides, graduations or marks 628 and a plurality of minor guides, graduations or marks 630. Each of the major graduations 628 is spaced apart from its adjacent neighbours. Each of the spacings between the pairs of major graduations 628 is substantially equal in size. Each of the minor graduations 630 is spaced apart from its adjacent neighbours. Each of the spacings between the pairs of minor graduations 630 is substantially equal in size.

Similarly, to the first indicia $I_1$, the second indicia $I_2$ comprises a single minor graduation 630 between a pair of major graduations 628. The single minor graduation 630 is spaced equidistantly apart from each of the pair of major graduations 628. In other embodiments, more than one minor graduation 630 may be provided between a pair of major graduations 628.

Each of the major graduations 628 comprises, or is associated with, an identifier. The identifiers are arranged in a sequence. In this illustrated embodiment, the second face 623 comprises a series of numeric identifiers. The series of numeric identifiers follows an arithmetic progression having a common difference of 1. The series of numeric identifiers commences at the upper or first end of the cake support device and increases towards the second end. Each numeric identifier interrupts or overlies a respective one of the major graduations 628. Only an upper portion of the second face 623 of the shaft 622 is provided with the second indicia $I_2$.

The second indicia $I_2$ forms a second measurement scale for measuring an amount of the cake support device to be removed such that the cake support device is substantially equal in height to a tier of a cake. The second measurement scale is inverted with respect to the first measurement scale.

The numeric sequence of each of the first and second indicia commences at a common number; that is to say they both start at number "1".

It will be appreciated that the first and second indicia $I_1$, $I_2$ comprise the same arithmetic sequence or progression, the direction of the arithmetic progression of the second indicia $I_2$ being reversed or inverted with respect to the direction of the arithmetic progression of the first indicia $I_1$.

A user can insert the cake support device 620 into a tier of a cake, they can read or measure the distance between the upper surface of the tier of cake and the first end of the shaft 622 by inspection of the second measurement scale. The user may then remove the cake support device 620 for adjusting its length. Using the measurement made on the second measurement scale they can employ the first measurement scale, by finding the same numeric identifier, to determine the position at which to cut or otherwise shorten the cake support device 620 such that the first end of the cake support device is disposed at the same or similar height or level with the upper surface of the tier of cake. In this way, the first end or head 624 of the cake support device is substantially flush with, or in contact with, the upper surface of the tier of cake when reinserted. The user may similarly adjust the length of one or more similarly configured cake support devices without needing to insert each into the cake tier beforehand. In this way two or more cake support devices 620 may be adjusted to be of the same or equal length based upon a single measurement.

Figure 10:
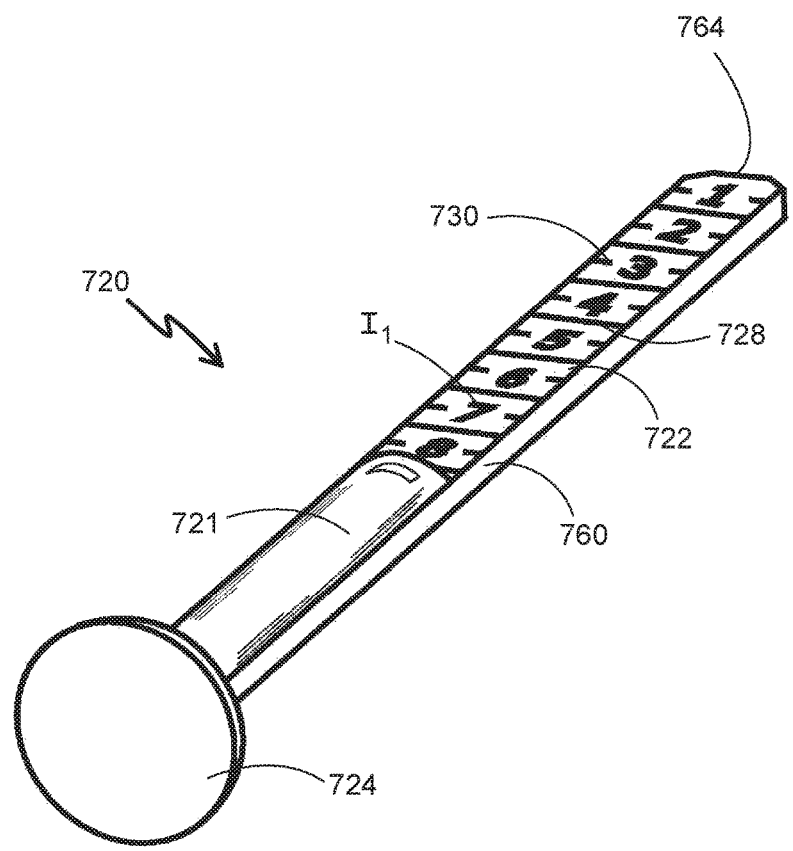
FIG. 10 is a perspective view of a cake support device according to another embodiment of the disclosure.
Figure 11A:
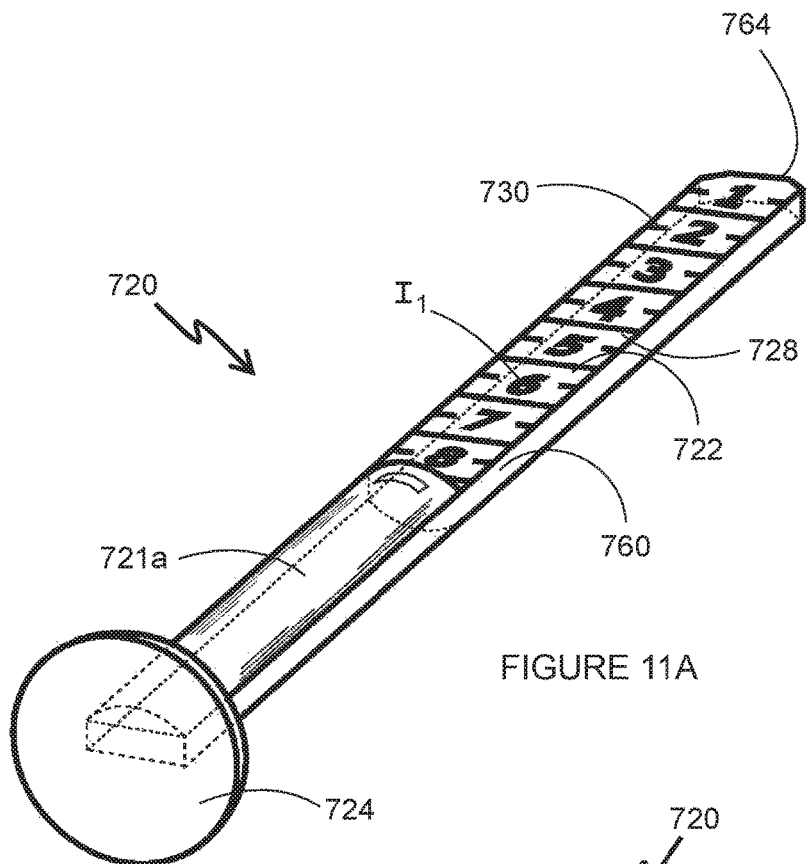
FIG. 11A is a side view of the disclosure cake support device of FIG. 10.
Figure 11B:
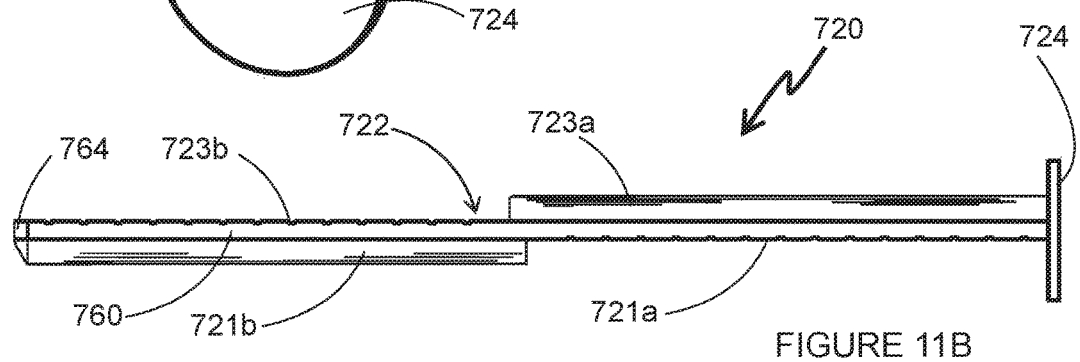
FIG. 11B is a side view of a cake support device according to an alternative embodiment of the disclosure.
Figure 11C:
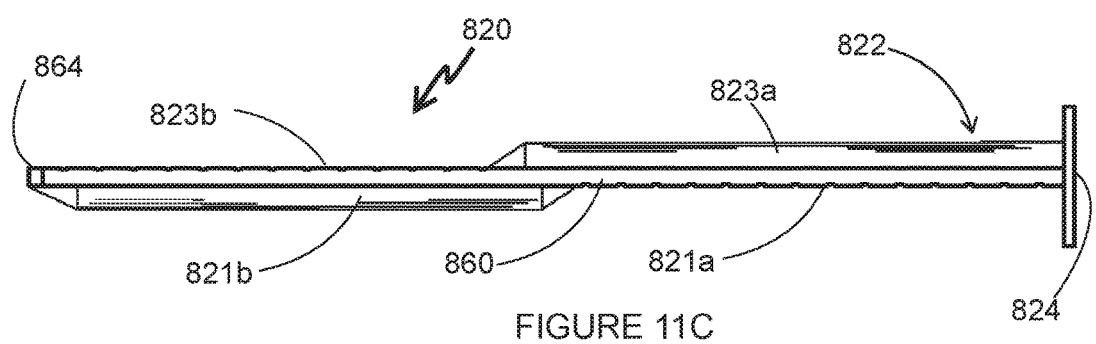
FIG. 11C is a side view of a cake support device according to an alternative embodiment of the disclosure.

Referring now to FIGS. 10 to 11C, there are shown further embodiments of the present disclosure. In the eighth and ninth illustrated embodiments like numerals have, where possible, been used to denote like parts, albeit with the addition of the prefix "700" or "800" to indicate that these features belong to the eighth or ninth embodiment respectively. The further embodiments share many common features with the previous embodiments and therefore only the differences from the embodiments illustrated in FIGS. 1 to 9B will be described in detail.

FIGS. 10 and 11A show perspective views of a cake support device 720 of the present disclosure, are shown. In FIG. 11A dashed or phantom lines have been employed to illustrate features hidden from view in FIG. 10. The cake support device 720 comprises a shaft 722; the shaft 722 is substantially elongate in shape. A head 724 is provided at a first, upper, end of the shaft 722. A second, lower, end 764 of the shaft 722 comprises opposing chamfered corners to as to reduce the width of the shaft 722 towards the second end 764. This facilitates insertion of the cake support device 720 into a foodstuff such as baked foodstuff or cake.

In some embodiments, the head 724 and shaft 722 are integrally formed as a unitary piece. In other embodiments, the head 724 may be formed as separate component mountable upon the shaft 722. In other embodiments where the head 724 is omitted or of the same width as the shaft 722, the opposing chamfered corners (or point) may serve to identify the first end from the second end, the opposing chamfered corners (or point) being omitted from the first end.

The cake support device 720 shown in FIGS. 10 to 11B comprises an upper portion which is substantially arch shaped or "D" shaped in cross sectional shape and a lower portion which is substantially arch shaped or "D" shaped in cross sectional shape. In the illustrated embodiment, the arch shape may be considered to be the formed combination of a circular segment with a rectangle.

The cake support device 720 shown in FIGS. 10 to 11B comprises an upper first face portion 721a, a lower first face portion 721b, an upper second face portion 723a and a lower second face portion 723b.

The lower first face portion 721b provides a first flat planar surface upon which the first indicia $I_1$ is displayed. The upper second face portion 723a provides a second flat planar surface upon which the second indicia $I_2$ is displayed.

The upper first face portion 721a and the lower second face portion 723c each provide a curved surface.

In this way, the upper portion of the shaft comprises a first reinforcing or strengthening member and the upper portion of the shaft comprises a second reinforcing or strengthening member.

In other embodiments, the cross-sectional shape may differ; the upper portion of the shaft 724 may instead comprise a triangular or other cross sectional shape. In some embodiments, the upper first face portion 721a or lower second face portion 723b or both the upper first face portion 721a and lower second face portion 723b may comprise one or more ribs or ridges, optionally extending longitudinally, for increasing the rigidity of the shaft 724. In this way, the one or more ribs or ridges may form reinforcing or strengthening members.

In this way, the lower first face portion 721b and the upper second face portion 723a provide surface upon which the first indicia $I_1$ and second indicia $I_2$ are readily readable. This may have the advantage of allowing text or other graphics to be larger in size when compared to providing them upon a curved surface such as those of the upper first face portion 721a and the lower second face portion 723c.

It is envisaged that the cake support device 720 may be formed in single moulding process such as but not limited to injection moulding. However, in some embodiments the cake support device 720 may be formed in a multiple stage moulding process. The device of FIG. 8B may be formed in a first stage, optionally first and second indicia $I_1$, $I_2$ may extend along the entire length of the shaft 622. In a second stage a second component may be overmoulded, welded or otherwise mounted to opposing sides of the shaft 622. The second components may be provided only to an upper first face portion 721a and the lower second face portion 723c, in alternative embodiments the second components may be provided along the entire length of the shaft 622 in such embodiments the second component may be transparent such that at least portions of the first and second indicia $I_1$, $I_2$ are visible through the second components.

In the illustrated embodiment of FIGS. 10 to 11B the upper first face portion 721a and the lower second face portion 723c which provide the opposed curved surfaces are arranged to partially overlap in a longitudinal direction, in this way in the region of overlap the shaft 722 comprises a cross section having an oblong shape, it may be considered an ellipse with flat or linear ends, that is to say it comprises two opposing linear edges and two opposing arcuate edges.

In other embodiments, there may be no overlap between the upper first face portion 721a and the lower second face portion 723c, in such embodiment the shaft may comprise a region having a substantially rectangular cross sectional shape.

In the embodiment of FIG. 11C the lowermost end 872 of the upper first face portion 821a is tapered or chamfered. This may facilitate insertion of the cake support device 820 into a cake tier.

Similarly, the lowermost end 874 of the lower second face portion 823b is tapered or chamfered. Again, this may facilitate insertion of the cake support device 820 into a cake tier.

The uppermost end 876 of the lower second face portion 823b is tapered or chamfered. This may facilitate withdrawal of the cake support device 820 from a cake tier.

It is to be understood that while specific embodiments of the invention are illustrated, it is not to be limited to the specific form or arrangement of parts or use herein described and shown. For instance, although the support device of the present disclosure, having profiles of various shapes, has been described for use in supporting multi-tiered cakes, such support devices could also be formed as hollow tubes.

It can be appreciated that various changes may be made within the scope of the present invention. For example, the size and shape of the device may be adjusted to accommodate cakes of differing size or shape. In some embodiments of the invention the cake support device may comprise a length measured along the longitudinal direction of the shaft of between 200 mm and 300 mm, however in other embodiments other length dimensions may be used.

It will be recognized that as used herein, directional references such as "top", "bottom", "base", "front", "back", "end", "side", "inner", "outer", "upper" and "lower" do not necessarily limit the respective features to such orientation, but may merely serve to distinguish the features from one another.

What is claimed is:

1. An internal cake support device for forming a multi-tiered cake comprising:
    a shaft having a first end and a second end and comprising at least one face;
    at least a first portion of the at least one face comprising a first measurement scale for measuring a linear dimension from the second end of the shaft; and
    at least a second portion of the at least one face comprising a second measurement scale for measuring a linear dimension from the first end of the shaft.

2. An internal cake support device for forming a multi-tiered cake comprising:
    a shaft having a first end and a second end and comprising a first face and a second face;
    at least a portion of the first face comprising a first measurement scale for measuring a linear dimension from the second end of the shaft; and
    at least a portion of the second face comprising a second measurement scale for measuring a linear dimension from the first end of the shaft.

3. The internal cake support device of claim 2 wherein the second face comprises a first reinforcing member disposed at least in part in opposition to said portion of the first face comprising the first measurement scale.

4. The internal cake support device of claim 3 wherein the first face comprises a second reinforcing member disposed at least in part in opposition to said portion of the second face comprising the second measurement scale.

5. An internal cake support device for forming a multi-tiered cake comprising:
    a shaft having a first end and a second end;
    a head mounted to the first end;
    a first measurement scale for measuring a linear dimension from the second end of the shaft; and
    a second measurement scale for measuring a linear dimension from the first end of the shaft.

6. The internal cake support device of claim 5 wherein the first measurement scale is integrally formed with the shaft.

7. The internal cake support device of claim 5 wherein the second measurement scale is integrally formed with the shaft.

8. The internal cake support device of claim 5 wherein the first and second measurement scales each comprise numeric reference signs.

9. The internal cake support device of claim 5 wherein the first and second measurement scales each comprise alphabetic reference signs.

10. The internal cake support device of claim 5 wherein the first and second measurement scales each comprise symbolic reference signs.

11. The internal cake support device of claim 5 wherein the first and second measurement scales each employ geometric shapes as reference signs.

12. The internal cake support device of claim 5 wherein the shaft comprises a first face upon which the first measurement scale is provided.

13. The internal cake support device of claim 12 wherein the shaft comprises a second face upon which the first measurement scale is provided.

14. The internal cake support device of claim 13 wherein the shaft comprises a third face providing a display region for the display of information.

15. The internal cake support device of claim 5 wherein the shaft comprises a substantially triangular cross-sectional shape.

16. The internal cake support device of claim 5 wherein the second end of the shaft comprises a point for facilitating insertion into a tier of cake.

17. A support device for use with multi-tiered foodstuffs comprising:
    a shaft having a first end and a second end;
    a head mounted to the first end;
    a first measurement scale for measuring a linear dimension from the second end of the shaft; and a cutting guide configured for slidably mounting upon the shaft.

18. The support device of claim 17 comprising a second measurement scale for measuring a linear dimension from the first end of the shaft.

19. A foodstuff support system for use when forming a multi-tiered foodstuff comprising:
   a first device including:
      a shaft having a first end and a second end;
      a head mounted to the first end;
      a first measurement scale for measuring a linear dimension from the second end of the shaft; and
      a cutting guide configured for slidably mounting upon the shaft; and
   at least one second device including:
      a shaft having a first end and a second end;
      a head mounted to a first end; and
      a second measurement scale for measuring a linear dimension from the first end of the shaft of the second device.

20. A method for forming a multi-tiered cake comprising:
   inserting an internal cake support device into a first tier of a cake, the device comprising a shaft having a first end and a second end, a head mounted to the first end, a first measurement scale for measuring a linear dimension from the second end of the shaft and a second measurement scale for measuring a linear dimension from the first end of the shaft;
   determining a first distance along the shaft between the first end of the device and an upper surface of the first tier of the cake using the second measurement scale;
   removing the internal cake support device from the first tier of a cake;
   measuring the first distance from a second end along a shaft of at least one further internal cake support device using a first measurement scale provided thereon to determine a cutting position;
   cutting the shaft of each at least one further internal cake support device at the cutting position; and
   inserting each at least one further internal cake support device into the first tier of a cake.

21. A method for forming a multi-tiered cake comprising:
   inserting an internal cake support device into a first tier of a cake, the device comprising a shaft having a first end and a second end, a head mounted to the first end, a first measurement scale for measuring a linear dimension from the second end of the shaft and a second measurement scale for measuring a linear dimension from the first end of the shaft;
   determining a first distance along the shaft between the first end of the device and an upper surface of the first tier of the cake using the second measurement scale;
   removing the internal cake support device from the first tier of a cake;
   selecting at least one further internal cake support device comprising a shaft having a first end and a second end, a head mounted to the first end and a first measurement scale for measuring a linear dimension from the second end of the shaft;
   measuring the first distance from the second end of the device along the shaft of said at least one further internal cake support device using the first measurement scale to determine a cutting position;
   cutting the shaft of each at least one further internal cake support device at the cutting position; and
   inserting each at least one further internal cake support device into the first tier of a cake.

22. A method for forming a multi-tiered cake comprising:
   inserting an internal cake support device into a first tier of a cake, the device comprising a shaft having a first end and a second end, a head mounted to the first end, a first measurement scale for measuring a linear dimension from the second end of the shaft and a second measurement scale for measuring a linear dimension from the first end of the shaft;
   determining a first distance along the shaft between the first end of the device and an upper surface of the first tier of the cake using the second measurement scale;
   measuring the first distance along the shaft from the second end of the device using the first measurement scale to determine a cutting position;
   removing the internal cake support device from the first tier of a cake;
   cutting the shaft at the cutting position; and
   reinserting the internal cake support device into the first tier of a cake.

23. An internal cake support device for forming a multi-tiered cake comprising:
   a shaft having a first end and a second end;
   a first measurement scale for measuring a linear dimension from the second end of the shaft; and
   a second measurement scale for measuring a linear dimension from the first end of the shaft.

24. The internal cake support device of claim 23 wherein a head is provided at a first end of the shaft for receiving an upper tier.

25. The internal cake support device of claim 23 wherein a head is mounted to the shaft at the first end for receiving an upper tier.

26. The internal cake support device of claim 23 wherein a head is integrally formed with the shaft at the first end for receiving an upper tier.

27. An internal cake support device for forming a multi-tiered cake comprising:
   a shaft having a first end and a second end and comprising at least one face; and
   wherein at least a portion of the at least one face comprises a first measurement scale for measuring a linear dimension from the first end of the shaft.

* * * * *